United States Patent
Allio

(10) Patent No.: US 6,262,743 B1
(45) Date of Patent: *Jul. 17, 2001

(54) AUTOSTEREOSCOPIC IMAGE ACQUISITION METHOD AND SYSTEM

(76) Inventor: Pierre Allio, 81 Rue de la Mare, Paris (FR), 75020

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/973,770
(22) PCT Filed: Jun. 21, 1996
(86) PCT No.: PCT/FR96/00969
    § 371 Date: Mar. 20, 1998
    § 102(e) Date: Mar. 20, 1998
(87) PCT Pub. No.: WO97/01250
    PCT Pub. Date: Jan. 9, 1997

(30) Foreign Application Priority Data

Jun. 22, 1995 (FR) .................................................. 95 07480

(51) Int. Cl.$^7$ ...................................................... G06T 15/00
(52) U.S. Cl. ............................... 345/427; 345/6; 348/59
(58) Field of Search ..................... 359/462, 463; 348/42; 345/6, 427

(56) References Cited

U.S. PATENT DOCUMENTS 4,541,007 * 9/1985 Nagata ................................... 348/48

FOREIGN PATENT DOCUMENTS

| 146476 | 6/1985 | (EP) . |
| 641132 | 3/1995 | (EP) . |
| 650301 | 4/1995 | (EP) . |
| WO 91/06185 | 5/1991 | (WO) . |

OTHER PUBLICATIONS

Börner, R., Autostereoscopic 3D–Systems with Intermediate Images in Large Lenticular Screens, *Fernseh–und Kinotechnik*, vol. 44, No. 10, Jan. 1, 1990, pp. 556–564.

Allio, P. et al., "A 3D Process for Video Snapshot or Computer Imaging and Visualization without Glasses", *L'Onde Electrique*, vol. 71, No. 1, Jan. 1, 1991, pp. 26–32.

Yamaguchi, S. et al., "Stereoscopic Video Movie Camera 3D–CAM", IEEE Technical Paper, IEEE 1988 International Conference on Consumer Electronics, Jun. 8, 1988, pp. 178–179.

Takemura, Y. et al., Stereoscopic Video Movie Camera Using 300K Pixel IT–CCD Sensors, IEEE Technical Paper, IEEE Transactions on Consumer Electronics, vol. 37, No. 1, Feb. 1, 1991, pp. 39–43.

Tsunoda Y. et al., "Three–Dimensional Color Display by Projection–Type Composite Holography", IEEE Technical Paper, IEEE Transactions on Electron Devices, vol. ED–22, No. 9, Sep. 1975, pp. 784–788.

* cited by examiner

*Primary Examiner*—Mark Zimmerman
*Assistant Examiner*—Philip H. Stevenson
(74) *Attorney, Agent, or Firm*—Alston & Bird LLP

(57) ABSTRACT

The invention relates to a method of acquiring simulated autostereoscopic video images of a scene to be viewed. On the basis of stored data containing three-dimensional information, it implements n simulated cameras, with $n \geq 3$, each generating an image of a scene on a given optical axis. The optical axes of the simulated cameras converge at a point situated at the same distance D from the simulated cameras. The scene to be viewed has a nearest point $P_p$ and a farthest point $P_e$, and the inter-camera distance and the distance $D_{min}$ between the simulated cameras and the nearest point $P_p$ are selected in such a manner that for focus varying between the nearest point $P_p$ and the farthest point $P_e$ the angle $2\alpha$ between two adjacent simulated cameras varies between a value not greater than 4.5° for the point $P_p$ and a value not less than 0.2° for the point $P_e$.

18 Claims, 3 Drawing Sheets

AUTOSTEREOSCOPIC IMAGE ACQUISITION METHOD AND SYSTEM

The present invention relates to a method of acquiring simulated autostereoscopic video images.

BACKGROUND OF THE INVENTION

At present, there is a considerable amount of software on the market for computer-aided design (CAD) making it possible to store data corresponding to three-dimensional information about objects or a scene to be observed. The software incorporates processing means that enable only a flat image of the object or the scene to be viewed in perspective on a screen at angles of observation that can be selected at will.

Methods of stereoscopic simulation having two viewpoints have been proposed, e.g. in European patent applications numbers EP-125 480 (HONEYWELL) and EP-172 110 (GIRAVIONS DORAND), however they operate by storing stereoscopic half-images and are therefore not suitable for use with the above-mentioned software.

The Applicant has developed an autostereoscopic video system having more than two elementary images, also referred to as "viewpoints", typically presenting a number n of viewpoints that is equal to 4, and is proprietor of various patents or patent applications relating in particular to an autostereoscopic video picture-taking device, and in particular French patent numbers 87 11764 (FR-2 619 664), 93 05381 (FR-2 705 007), and 93 05383 (FR-2 704 951).

That autostereoscopic video system makes it possible for an observer, without wearing special spectacles, to see images in relief on a screen that is fitted with an optical selector such as a lens array, and to do so under good conditions of visual comfort, given that the observer is not constrained to occupy a precise position for viewing.

The terms "row" and "column" are used respectively to designate horizontal lines and vertical rows of pixels as seen by an observer whether standing or sitting, and independently, for example, of the direction in which a cathode ray display tube is scanned, i.e. horizontally or vertically. For example, on a CRT having vertically oriented scan lines, such scan "lines" will be referred to as "columns".

At present, when displaying stored data as defined above, there is no technical solution making it possible to simulate a display in relief under conditions of visual comfort that enable the autostereoscopic effect to be visible at more than two viewpoints.

Autostereoscopic cameras make use of a lens array, generally an array of cylindrical lenses, and simulation thereof can lead only to a model that is extremely complicated requiring large computer power when generating a complex image having a plurality of interleaved viewpoints that comply with the parameters for autostereoscopy. One such model has been envisaged in the article by Pierre ALLIO entitled "Procédé pour la prise de vue vidéo ou la synthèse d'images en relief et la visualisation en relief" [A method for taking video pictures or for synthesizing images in relief and for displaying in relief], published in l'Onde Electrique, Vol. 71, No. 1, pp. 26–32, Jan. 1, 1991, Paris. The model envisaged in that article implies implementing a specially modified version of a software package (Turbo CAD 3D) relying on vector forms being generated that are displayed substantially in real time for the purpose of computing images in real time, or for making animated films of synthesized images (but not in real time).

The problem posed by the present invention is thus a problem that is difficult to solve, a priori, and the solutions that can be envisaged would appear, a priori, to exclude applications outside the laboratory.

The invention is based on the idea that, surprisingly, it is possible to simulate an auto-stereoscopic camera, a single camera of the type mentioned above, by means of a plurality of elementary cameras, i.e. by a picture-taking system that is by definition not autostereoscopic and which normally gives rise to large problems of practical implementation, even when there are only two cameras and therefore only two viewpoints, e.g. as in the case of the system known under the name "IMAX 3D" and which turns out to be extremely complex when the number of viewpoints exceeds 2.

Another two-camera apparatus is known from IEEE 1988 International Conference on Consumer Electronics, Rosemont, Jun. 8, 1988, pp. 178–179, Shinichi Yamaguchi "Stereoscopic video movie camera 3D-CAM".

That document relates to a "3D-CAM" camera for taking stereoscopic images from two viewpoints, which images are then displayed in alternation on a screen, viewing being performed through spectacles that are fitted with liquid crystal shutters controlled so as to transmit one image at a time alternately to the left eye and to the right eye.

That document relates to a system for taking images (and not for simulating them) and it has only two viewpoints, a configuration in which problems associated with autostereoscopy do not arise and in which the observer needs to have spectacles or else is constrained to remain in a fixed position relative to the screen.

Yet another two-camera apparatus is known from IEEE Transactions on Consumer Electronics, Vol. 37, No. 1, Feb. 1, 1991, pp. 39–43, Yasuo Takemura "Stereoscopic video movie camera using 300K pixel IT-CCD sensors". While viewing, that apparatus requires the wearing of spectacles fitted with liquid crystal shutters.

European patent application EP-641 132 (MATSUSHITA) relates to a two-camera apparatus for taking pictures in which the angle between the cameras is determined in such a manner as to make binocular fusion of the nearest point possible. That picture-taking apparatus having two viewpoints (i.e. not a simulation) cannot take into account the specific problem associated with autostereoscopy having three or more viewpoints.

According to the invention, simulation is made possible by taking appropriate account of the physical, optical, and perception parameters for an autostereoscopic system having more than two viewpoints.

OBJECTS AND SUMMARY OF THE INVENTION

An object of the present invention is thus to provide a method of acquiring simulated autostereoscopic images that does not require complicated computation.

Another object of the invention is to provide a method making it possible from a standard database containing synthetic video images including three-dimensional information to generate autostereoscopic images enabling viewing in relief on a screen fitted with an array such as a lens array, without requiring dedicated software to be provided, nor even existing software to be modified.

Another object of the invention is to provide a method making it possible to simulate animated images in real or quasi-real time.

A simulated camera has an optical center, e.g. a pinhole, and a simulated sensitive surface having a center which is defined as the cross-point of the diagonals of the image that will subsequently be viewed on a screen.

The invention thus provides a method of acquiring simulated autostereoscopic images, wherein, starting from stored data including three-dimensional information about an object or the scene to be viewed on a display screen, it implements n simulated cameras, where n≧3, each generating an image of said scene, each of said images constituting a viewpoint of an autostereoscopic image, the simulated cameras being equidistant and spaced apart by the same inter-camera distance b which remains constant while a picture is being taken, the cameras having a constant field angle, and each of the simulated cameras having an axis passing through its optical center, and a point referred to as the simulated sharp point, situated substantially at the same distance D' from all of said simulated cameras, wherein the scene to be viewed has a nearest point $P_p$ and a farthest point $P_e$, and wherein the inter-camera distance b and the distance $D_{min}$ between the simulated set of cameras and the nearest point $P_p$ are selected in such a manner that for taking said picture and for a sharp point that varies between the nearest point $P_p$ and the farthest point $P_e$, the angle 2α between said axes of two adjacent simulated cameras varies between a value that is not greater than 4.5° for the point $P_p$ and not less than 0.20° for the point $P_e$.

This method can be implemented in the context of an autostereoscopic system having more than two viewpoints, and corresponds to a normal depth of stereoscopic field, which concept is distinct from the conventional depth of field of an objective lens system and is explained in greater detail in the description below.

This concept of stereoscopic depth of field is specific to autostereoscopy having more than two viewpoints, and, as explained below, it makes it possible to define conditions for satisfactory perception in relief.

In a particularly advantageous variant of the method that makes it possible to extend natural perception of relief to infinity, for a scene including a point $P_e$ situated at infinity, the inter-camera distance b is selected so that for the angle 2α having a value of 0.2°, the simulated sharp point is situated at a distance $D_{max}$ such that the image of an object moving from the distance $D_{max}$ to infinity along the bisector of said axes of two extreme simulated cameras moves on the display screen through a distance no greater than $n^2$ times the pixel pitch, which corresponds to n lenses on the display screen, each lens covering n pixels.

A particularly advantageous implementation of the method of the invention concerning the case where the number of viewpoints is increased by creating additional intermediate viewpoints without changing the stereoscopic base nor the solid display angle, and more particularly suitable for use in a high definition context with a number of viewpoints greater than four, makes it possible to obtain greater stereoscopic depth of field, which in turn makes it possible, other things remaining equal, for the user to have greater latitude of displacement in front of the display screen. In this preferred implementation, starting from stored data including three-dimensional information about the scene to be viewed on a display screen, the method implements n simulated cameras, where n>4, each generating an image of said scene, the simulated cameras being equidistant and spaced apart by the same inter-camera distance b which remains constant while a picture is being taken, the simulated cameras having a constant field angle, each of the simulated cameras having an axis passing through its optical center, and a point referred to as the simulated sharp point, situated substantially at the same distance D' from all of said simulated cameras, the scene to be viewed has a nearest point $P_p$ and a farthest point $P_e$, and the inter-camera distance b and the distance $D_{min}$ between the simulated set of cameras and the nearest point $P_p$ are selected in such a manner that for taking said picture and for a sharp point that varies between the nearest point $P_p$ and the farthest point $P_e$, the angle 2α between said axes of two adjacent simulated cameras varies between a value that is not greater than 18°/n for the point $P_p$ and not less than 0.8/n for the point $P_e$.

In a particularly advantageous variant enabling natural perception of relief to extend to infinity, for a scene including a point $P_e$ situated at infinity, the inter-camera distance b is selected so that for the angle 2α having a value of 0.8°/n, the simulated sharp point is situated at a distance $D_{max}$ such that the image of an object moving from the distance $D_{max}$ to infinity along the bisector of said axes of two extreme simulated cameras moves on the display screen through a distance no greater than $n^2$ times the pixel pitch, thus giving rise both to a sharp image and to a sensation of continuous movement between the viewpoints all the way to infinity.

The method of the invention thus makes it possible to perform simulation in particularly simple manner, which is paradoxical, given that it is well known that stereoscopic systems having a plurality of cameras are particularly complicated and difficult to implement, even when they are restricted to two viewpoints and two cameras.

The said axes may be the optical axes of the simulated cameras.

In a preferred implementation, the simulated cameras have their simulated sensitive surfaces mutually parallel and disposed substantially in a common plane.

In a particularly advantageous implementation, the simulated cameras are of the pinhole type.

When viewing is by way of a television screen having a lens array placed in front of it, each elementary image can be directly obtained in the anamorphosed format corresponding to its degree of autostereoscopy by allocating vertical resolution to each image point of the simulated camera equal to the vertical resolution of the video image, and horizontal resolution equal to the horizontal resolution of the video image divided by the number n of viewpoints. Thereafter, it suffices to interleave the elementary images obtained in order to obtain a simulated autostereoscopic image that can be viewed on a television screen.

In the invention, it is also possible to obtain an effect of apparently changing the size of an object or of a scene without disturbing its shape from focusing at said distance D' by moving the simulated cameras relative to said object without changing either the sharp point or the angle 2α, and by modifying the value of b in proportion to the modification in the focusing distance.

In a preferred implementation, the image includes stereoscopic pairs having a given stereoscopic base B, the viewpoints of said stereoscopic pair being separated by m intermediate viewpoints, where m is an integer >1. It may include a step of viewing under conditions where, at the ideal, "solid color" distance, an observer sees one of said stereoscopic pairs having viewpoints that are separated by m elementary viewpoints.

The invention also provides an autostereoscopic video system comprising:

apparatus for acquiring simulated autostereoscopic video images of a scene to be viewed, the apparatus comprising a database containing stored data including three-dimensional information about an object or the scene to be viewed on a display screen, apparatus for generating n simulated cameras, where $n \geq 3$, each generating an image of said scene, the simulated cameras being equidistant and spaced apart by a common inter-camera distance b which remains constant while taking pictures with a constant field angle, and each having an axis passing through its optical center and through a "simulated sharp point" situated substantially at the same distance D' from all of said simulated cameras, the scene to be viewed having a nearest point $P_p$ and a farthest point $P_e$, said apparatus for generating n simulated cameras being set up so that the inter-camera distance b and the distance $D_{min}$ between the set of simulated cameras and the nearest point $P_p$ satisfies the condition whereby, for said picture and for focusing varying between the nearest point $P_p$ and the farthest point $P_e$, the angle $2\alpha$ between said axes of two adjacent simulated cameras varies between a value not greater than 4.5° for the point $P_p$ and a value not less than 0.2° for the point $P_e$; and display apparatus in which an observer at the ideal, "solid color" distance sees a stereoscopic pair comprising two viewpoints separated by m intermediate viewpoints where m is greater than or equal to 1.

In the system the apparatus for generating n simulated camera may be set up so that, for a scene having a point $P_e$ situated at infinity, the inter-camera distance b is such that for the angle $2\alpha$ having a value equal to 0.2°, the simulated sharp point P is situated at a distance $D_{max}$ such that the image of an object moving from the distance $D_{max}$ to infinity along the bisector of said axes of the two extreme simulated cameras moves on the display screen through a distance no greater than $n^2$ times the pixel pitch.

The invention also provides a system enabling the number of viewpoints to be increased by creating additional intermediate viewpoints, the system comprising:

apparatus for acquiring simulated stereoscopic video images of an object or of a scene to be viewed, the apparatus comprising a database containing stored data including three-dimensional information about the object or the scene to be viewed on a display screen, apparatus for generating n simulated cameras, where n>4, each generating an image of said scene, the simulated cameras being equidistant and spaced apart by a common inter-camera distance b which remains constant while taking pictures, and each of the simulated cameras has an axis passing through its optical center and a "simulated sharp point" situated substantially at the same distance D' from all of said simulated cameras, the scene to be viewed having a nearest point $P_p$ and a farthest point $P_e$, and said apparatus for generating n simulated cameras being set up so that the inter-camera distance b and the distance $D_{min}$ between the set of simulated cameras and the nearest point $P_p$ satisfies the condition whereby, for said picture and for focusing varying between the nearest point $P_p$ and the first point $P_e$, the angle $2\alpha$ between said axes of two adjacent simulated cameras varies between a value not greater than 18°/n for the point $P_p$ and a value not less than 0.8°/n for the point $P_e$; and display apparatus in which an observer at the ideal, "solid color" distance sees a stereoscopic pair comprising two viewpoints separated by m intermediate viewpoints where m is greater than or equal to 1.

In the system the apparatus for generating n simulated camera may be set up so that, for a scene having a point $P_e$ situated at infinity, the inter-camera distance b is such that for the angle $2\alpha$ having a value equal to 0.8°/n, the simulated sharp point is situated at a distance $D_{max}$ such that the image of an object moving from the distance $D_{max}$ to infinity along the bisector of said axes of the two extreme simulated cameras ($C_1$, $C_4$) moves on the display screen through a distance no greater than $n^2$ times the pixel pitch.

The said axes may be the optical axes of the simulated cameras.

In a preferred embodiment, the simulated cameras have their simulated sensitive surfaces mutually parallel and disposed substantially in a common plane.

BRIEF DESCRIPTION OF THE DRAWINGS

Other characteristics and advantages of the invention appear more clearly on reading the following description, with reference to the accompanying drawings, in which.

MORE DETAILED DESCRIPTION

To define the principles for making an autostereoscopic image from synthetic images, it is necessary to simulate by computation a complex image that could be obtained using a camera as described in the Applicant's French patents No. 87 11764 (FR-2 619 664); No. 93 05381 (FR-A 2 705 007); and No. 93 05383 (FR-2 704 951).

According to the invention, in order to create this complex video image, it is not necessary to introduce a lens array if the de-interleaved image is considered as being obtained by the treatment described in the Applicant's French patent No. 93 03580 (FR-2 705 006). The image obtained in this way by the so-called "n image" mode can, for computation, be implemented by simulated cameras, providing they are virtually positioned in a particular manner as described below. The simulated cameras are advantageously equivalent to pinhole cameras. The resolution of the sensitive surface can be anisotropic such that for each image point or pixel, the resolution considered in the vertical direction is equal to the vertical resolution of the final image, while the horizontal resolution is equal to the horizontal resolution of the final image divided by n (the number of viewpoints). This makes display on a television screen possible. However, for a back-projection display using n projectors, the resolution remains isotropic.

Figure 1:
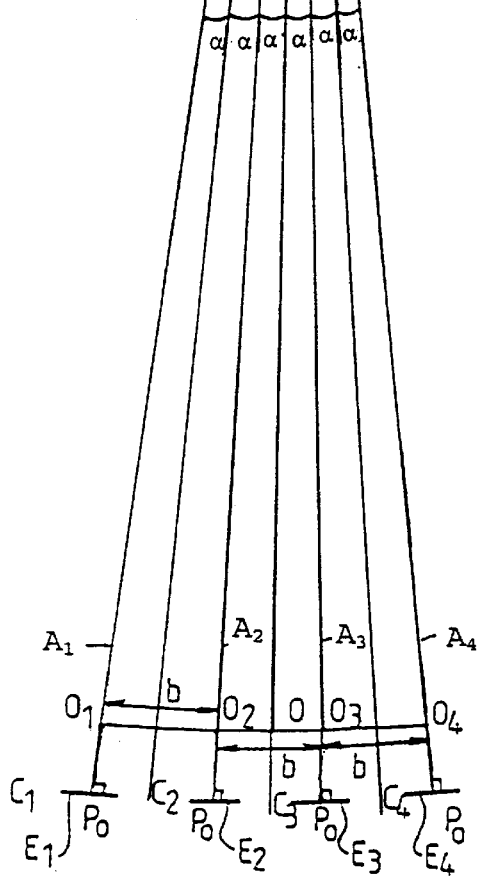
FIG. 1 is a diagram showing how the invention is implemented by means of simulated cameras, e.g. pinhole cameras.
Figure 2A:
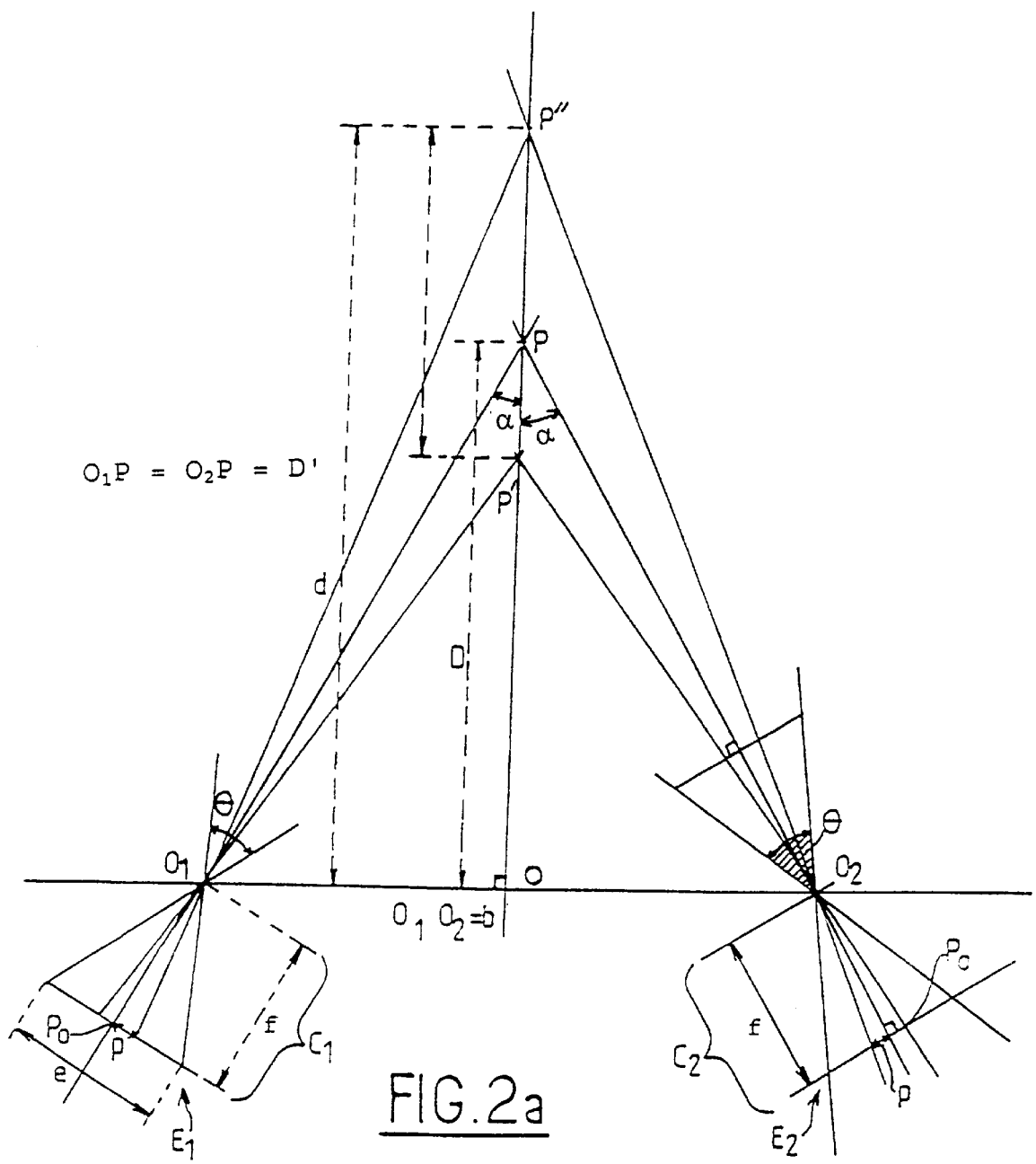
FIG. 2a is a detail of FIG. 1, showing the case of pinhole cameras, FIG. 2b being an illustration of the simulated screen of a pinhole camera of the invention.

With reference to FIGS. 1 and 2a, the n main optical axes $A_1$ to $A_4$, i.e. the straight lines passing through the midpoints $P_0$ of the simulated sensitive surfaces ($E_1, \ldots, E_4$) or the equivalent, and perpendicular to said surfaces ($E_1, \ldots, E_4$), pass through the pinholes ($O_1, \ldots, O_4$) and intersect at a single point P at a focusing distance D of the simulated autostereoscopic camera C. The angles ($2\alpha$) formed from said single point and the n optical axes of the simulated system, taken in pairs, lie between two limit values which are defined as a function of the particular observation conditions associated with n-viewpoint TV autostereoscopy.

To define the conditions at the limit and the method of simulating and/or implementing said autostereoscopic images, it is necessary to start from the above-defined autostereoscopic image and to analyze its characteristics.

In the autostereoscopic system envisaged in the invention, at least one additional viewpoint is created between the two viewpoints considered as being those that would be seen by the two eyes of an observer at the ideal, or "solid color", distance as defined below. The coherence between the viewpoints must be sufficiently close to that obtained by the above-mentioned autostereoscopic camera. It is also advantageous to create at least one additional viewpoint laterally to allow the head to move horizontally parallel to the plane of the screen, giving a total of four or more viewpoints. The set of viewpoints makes it possible to create an overall volume in which the observer can move and observe the screen (in particular on an axis perpendicular to the screen) without losing the perception of relief. It is this property which characterizes autostereoscopy compared with systems that use stereoscopic viewpoints in pairs only, without any intermediate viewpoints as defined above, and that constrain the observer to keep in a fixed position relative to the screen if viewing is performed without spectacles.

In a real case using a camera corresponding to the above-mentioned patents of the Applicant, the system has been built to enable 4-viewpoint images to be taken and viewed simultaneously without spectacles, using a single standard PAL CCIR camera at 50 Hz, a single objective lens system, and a standard video screen capable of displaying images in progressive mode (i.e. non-interlaced) with the axes of the lenses in the array being placed parallel to the rows of the image.

For viewing in an implementation corresponding to a preferred implementation of the present invention, the geometry of the image is adjusted initially to put it into correspondence with the lens array placed in front of the video screen so that the pitch of the lens array is substantially equal to the pitch of packets of four pixels, where "4" corresponds to the number of viewpoints selected for taking images in this particular case, so as to enable an eye of an observer at the selected observation distance to observe only one pixel modulo four through the lens array, which selected distance corresponds to the ideal, solid color distance.

Supposing that the observer closes one eye and moves the head parallel to the plane of the screen while keeping at a constant distance from the image, then that eye will see all of the viewpoints numbers 1, 2, 3, and 4 go past in succession. After seeing all of the viewpoints, the eye will see viewpoint No. 1 again, and thereafter, with continuing movement, the eye will see the following viewpoint numbers: 1, 2, 3, 4; 1, 2, 3, 4; 1, 2, 3, 4; 1, 2, 3, 4; 1, 2, 3, 4; etc. In other words, this is a modulo system in which the same viewpoints are seen several times over when the observer moves parallel to the screen. Each packet of four viewpoints corresponds to a viewing angle which depends on the image area occupied by four pixels on the screen and on the focal length of the array used for display purposes. The pitch of the lens array placed in front of the screen must be slightly smaller than that of the packets of four displayed pixels.

If respective references (a), (b), (c), and (d) are used for the sets of pixels in the first, second, third, and fourth of four successive columns of pixels in the video image, viewpoint No. 1 comprises all pixels (a) in the image, No. 2 all pixels (b), No. 3 all pixels (c), and No. 4 all pixels (d). At the ideal distance, the observer will see all of the pixels (a) with one eye and all of the pixels (b) or (c) or (d) with the other eye. Practice shows that it is desirable to present the following pairs [(a) and (c)] or [(b) and (d)] at the nominal display distance which is the ideal, solid color distance 1. If the spectator moves towards the screen, the edges of the solid angles move toward each other given that the inter-pupil spacing between the eyes is constant, so the spectator sees the pair (a) and (d). If the spectator moves away from the screen, the edges of the solid angle (lobe) move apart, so the spectator sees pairs [(a) and (b)] or [(b) and (c)] or [(c) and (d)]. In reality, because the images have been taken using the autostereoscopic system constituted by a single camera having a lens array and a single objective lens system, it is possible for the observer to move away from the ideal, solid color distance (initially selected distance) because of the exceptional coherence of the four viewpoints. These four viewpoints are as coherent as the multitude of images contained simultaneously in a bright image with low depth of field taken using a wide open objective lens system. This property also exists in the case simulated using the preferred implementation of the invention.

At the nominal observation distance (which is the ideal, solid color distance), the observer sees (for n=4) a stereoscopic pair formed in accordance with the invention by the first $I_1$ and third $I_3$ viewpoints or by the second $I_2$ and fourth $I_4$ viewpoints. This choice of parameters whereby a stereoscopic pair is formed not by two adjacent viewpoints but by two viewpoints having an intermediate viewpoint between them (or even m intermediate viewpoints where m≧1, in which case the elementary stereoscopic base between two adjacent viewpoints is equal to B/(m+1), B being the selected stereoscopic base) makes it possible for an observer not wearing special spectacles to have available a viewing volume in which the observer can move both parallel to the display screen and perpendicularly thereto, and characterizes uniform autostereoscopy within the meaning of the present application. B can be selected to be less than, equal to, or greater than the inter-pupil distance E (65 mm) of an observer.

As a result, and referring to the above example, an observer can move towards or away from the screen from the ideal, solid color distance or can indeed move laterally without losing stereoscopic vision.

Once the image is on the screen, if the spectator moves towards the display screen (which may be a projecting screen (e.g. a TV screen) or a back-projection screen) from the nominal observation distance (or ideal solid color distance), then the stereoscopic base as perceived grows larger, and if the spectator moves away from the screen, then it becomes smaller, and the overall sensation is constant because this variation in the stereoscopic base compensates exactly for variation in the sensation of depth associated with changes in vergence forces, i.e. the muscular forces implemented to cause the two rectinal images to overlap, thereby ensuring the stereoscopic fusion necessary for perception in relief, which necessarily accompany movements in the direction perpendicular to the screen.

When the "solid color" has been adjusted so that the observer sees viewpoints [($I_1$) and ($I_3$)] or [($I_2$) and ($I_4$)], and the observer moves far enough towards the display screen, then the user sees viewpoints ($I_1$) and ($I_4$) and can no longer move parallel to the screen, as in a real situation when looking from close up. When the observer moves away from the screen, then one of the following pairs of viewpoints will be seen [($I_1$) and ($I_2$)] or [($I_2$) and ($I_3$)] or [($I_3$) and ($I_4$)] and the user can move over a considerable distance, thus giving the observer the option of moving within a volume.

The same applies, with increased comfort, for cases where m is selected to be greater than 1.

Figure 5:
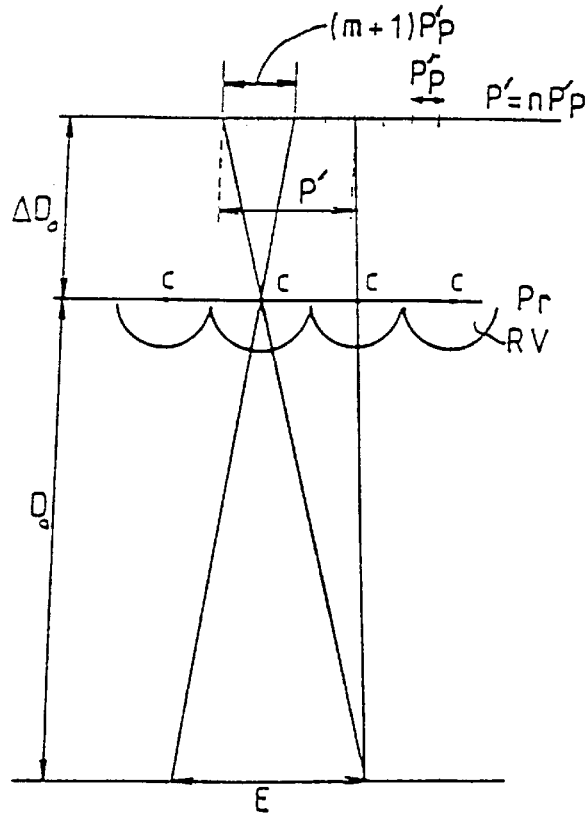
FIG. 5 shows the condition for uniform autostereoscopy in accordance with the invention.

FIG. 5 shows the condition for "solid color" when viewing a television screen. The image has interleaved columns of pixels. Each lens in the array RV of pitch $P_r$ corresponds to n columns of pixels on the screen. The centers C of the lenses are spaced apart by $\Delta D_0$ in the pixel plane on the screen. The pixel pitch is $p'_p$. $P'=np'_p$. At the "solid color" distance $D_0$, the following applies, conventionally:

$$\frac{P'}{P_r} = \frac{D_0 + \Delta D_0}{D_0}$$

The condition for uniform autostereoscopy (observing two viewpoints separated by m intermediate viewpoints when at the "solid color" distance) is: $\Delta D_0=(m+1)p'_p D_0/E$, where m is greater than or equal to 1.

Uniform autostereoscopy is thus a "modulo" system enabling an observer to move both parallel and perpendicular to a screen while conserving the perception of relief.

It is essentially different from the technique described in the article published in IEEE Transactions Electron Devices, Vol. 22, No. 9, September 1975, New York, by Y. Tsunoda entitled "Three-dimensional color display by projection-type composition holography", at pp. 784–785. That document relates to a stereoscopic display device using composite holography, and comprising N viewpoints.

Pictures are taken therein by angular scanning in N directions spaced apart by equal angles $\theta_0=\theta/(N-1)$ so as to enlarge the total display angle which thus becomes equal to $\theta=40°$, e.g. with $\theta_0=4°$ and N=11 viewpoints. The stereoscopic base between two adjacent viewpoints is equal to the inter-pupil distance. It is not a "modulo" system in which the same viewpoints are seen several times over when the observer moves parallel to the screen. In addition, there is no question of causing the angles to vary as a function of focusing distance, given that $\theta_0$ is selected to be equal to the aperture angle ($\pm 2°$) of the main lobe of the lenses in the display lens array. The observer must also remain at a distance from the screen that is determined in advance.

For a stereoscopic system having two viewpoints, or a stereoscopic system having stereoscopic images in pairs without intermediate viewpoints, it is recalled that observing without special spectacles requires the observer to occupy a fixed position that is determined very precisely, and an observer can be allowed to move only if wearing special separating spectacles (e.g. using colored glass or polarization), or wearing spectacles having liquid crystals that are controlled by infrared and that shut off the right eye and the left eye in alternation as in the above-mentioned IMAX 3D method.

To obtain synthetic images or recombined real images in a preferred implementation of the invention, it is necessary to reproduce the characteristics that are specific to the autostereoscopic camera if the basic qualities of uniform autostereoscopy as defined above are to be enjoyed, i.e. viewing a screen without wearing special spectacles while still leaving the observer free to move in a considerable volume.

With the limiting values defined below, these conditions constitute the principles that are necessary for acquiring simulated autostereoscopic images that can be viewed on a video screen in the preferred implementation of the invention.

Four main parameters need to be taken into consideration for synthesis computation or for recombining flat stereoscopic images in pairs to obtain an autostereoscopic image:
1) the total available stereoscopic base, and more particularly the effective stereoscopic base B/(m+1) between two adjacent viewpoints;
2) the value of the angle $2\alpha$ between the optical axes of two adjacent simulated pinhole cameras; these axes converge on a point of intersection situated at the distance of the simulated focus plane; this focus plane corresponds to the plane of the display screen if no horizontal translation is performed between the viewpoints on the image;
3) the horizontal resolution of the complete image, and the horizontal resolution of each viewpoint; and
4) the field angle of the simulated picture-taking system.

According to the invention, the pictures are taken simultaneously with n simulated cameras, with two adjacent cameras being spaced apart by a distance that is smaller than the distance between the eyes of an observer for an observation distance and a scene volume corresponding to viewing the displayed scene without enlargement or reduction.

At least three viewpoints are needed, with the number four being the preferred value for standard video definition (PAL, SECAM, or NTSC). In FIGS. 1 and 2a, four viewpoints are considered, which viewpoints are simulated by four pinhole cameras referenced $C_1$ to $C_4$, each having a respective pinhole $O_1$ to $O_4$, and a sensitive surface or screen $E_1$ to $E_4$ each having a center $P_0$. The screen $E_1, \ldots, E_4$ of each simulated camera is situated at a distance f, referred to as the focal length, from the pinhole $O_1, \ldots, O_4$, and it is of a width e. Such a simulation can be performed, for example, using the TURBO CAD 3D software package sold by HANDSHAKE, e.g. by generating each of the simulated cameras in succession.

When considering a system that is set up in such a manner that the simulated focal length $D_0$ and the real viewing distance in front of the screen (distance at which solid color is achieved) are equal and such that the image field and the size on the display screen ensure that an object which is 10 cm high in the focus plane is 10 cm high on the screen, which corresponds to linear magnification equal to 1, then, in the preferred embodiment (uniform autostereoscopy) and for m=1, it is necessary for the simulated stereoscopic base between two viewpoints that are visible simultaneously [(a) and (c)] or [(b) and (d)] at this observation distance to be as close as possible to the distance between the pupils of the observer, or in other words for the distance between two adjacent simulated cameras to be as close as possible to half the inter-pupil distance of the observer. Under such circumstances, the perception of relief is also the same as for the real scene.

Consequently, once the image is on the screen, if the spectator moves towards the display screen from the ideal, solid color distance, then the stereoscopic base actually perceived grows, and if the observer moves away from the screen, then the stereoscopic base shrinks and the overall sensation is constant because this variation in stereoscopic base compensates exactly for the variation in the sensation of depth that is associated with the change in vergence forces, i.e. the muscular forces applied to bring the two rectinal images into register so as to obtain the stereoscopic fusion necessary for perception in relief, which variation necessarily accompanies movement in the direction perpendicular to the screen.

When the "solid color" is set up so that the observer sees the points of view [(a) and (c)] or [(b) and (d)], and the observer moves close enough to the display screen, then the observer sees viewpoints [(a) and (d)] and can no longer move parallel to the screen, as in a real case when one is looking from close up. On going away from the screen, the observer sees viewpoints [(a) and (b)] or [(b) and (c)] or [(c) and (d)] and is free to move considerably, thus making it possible for the observer to move in a volume.

The notion of magnification is important since it makes it possible to determine the stereoscopic base required for a given angle 2α between two adjacent simulated cameras as a function of the volume of the scenes to be built up or reconstructed, even though the display screen parameters do not change. Surprisingly, it is possible in simple manner to simulate scenes while preserving all of the parameters with the exception of the size ratio between the computed or reconstituted scene and the scene perceived on the screen. For this purpose, it is necessary to adopt an inter-camera distance that keeps the angle 2α within certain limits. The volume of the scene and the observation distance are changed automatically. This leads to "macro" and even "micro" systems being simulated directly, and in the other direction to "hyper" systems also being simulated, while nevertheless conserving realistic perception of relief, the three dimensions remaining in a ratio such as to avoid exceeding the capacity of the observer to compensate perception.

If a given system is now considered, and if the simulated focusing distance is changed, for constant stereoscopic base, then it is the angle 2α between adjacent viewpoints that changes. For constant image field, and depending on the available horizontal monocular resolution, it is possible to distinguish objects that are spaced apart from one another in the depth direction with a certain amount of resolution that corresponds to the distance to be travelled to give rise to an observable change (or disparity) from one viewpoint to another. Given that the observer does not change distance from the screen beyond the possibilities described above, the disparity difference between viewpoints (greater disparity if the simulated focusing distance is less than the distance from the observer to the screen or smaller disparity if the simulated focusing distance is greater than said distance) is perceived as a deformation of the impression of depth compared with the reality that is simulated by the spectator having the eyes located at the pupil of the objective lens system of the simulated autostereoscopic camera. If the focus is too short, the observer perceives exaggerated depth. If the focus is too long, the observer perceives shrunken depth. In both cases there is lack of coherence in the image between its two dimensions (corresponding to a flat image) and the third dimension or depth, and such incoherence can exceed the capacity of the observer to compensate perception. This phenomenon must be taken into account when determining the limit angles 2α that must not be exceeded in order to preserve a "natural" impression. At greater and smaller values, it is necessary to modify the stereoscopic base to bring the value of the angle 2α back to within its limits as a function of the simulated focusing distances.

This leads to creating changes of scale in computed or reconstituted scenes, and thus to matching the linear magnification of the image with depth perception. The horizontal resolution usable for each viewpoint defines the size of depth segments that can be analyzed and observed in the image, and consequently the number of segments between the minimum and maximum focusing distances corresponding to the limits on the angle 2α, while not forgetting that the stereoscopic depth of field observable on the screen depends on the total number of viewpoints used, and on the pitch of the optical selector (lens array) on the screen.

If it were possible to simulate taking a picture with a continuous total pupil, with the objects being completely sharp and/or moving relative to one another in continuous manner when the observer moves the head parallel to the plane of the screen, the objects shown on the screen could appear to move on the screen between the limit viewpoints (a) and (d) through a horizontal distance equal only to the number n of viewpoints multiplied by the pitch of optical selector, i.e. by $n^2$ pixels.

It is this maximum displacement that defines the notion of stereoscopic depth of field.

If the simulation is performed with a pinhole camera, objects appear to move discontinuously, however the value of the stereoscopic depth of field remains the same as in the case of a continuous pupil.

With a real continuous pupil, objects therefore appear out-of-focus as soon as they have moved through more than n lenses with n viewpoints, and n pixels per lens, i.e. a displacement of more than $n^2$ pixels. The discrete nature of a CCD sensor gives rise to a compromise between genuine continuity and the discreteness associated with pinhole cameras.

The observed depth of field is defined as the distance between the nearest point $P_p$ and the farthest point $P_e$ of the scene to be viewed. The viewed depth of field can be increased only by simulating point-sized pupils or a non-continuous overall pupil (which is effectively what happens with pinhole cameras) with objects appearing to move in discrete jumps if they lie beyond a certain apparent distance on the display screen (⅓ in front and ⅔ behind the display distance), with the size of the jumps increasing with increasing distance from the screen, and with the objects remaining in focus.

When a stereoscopic depth of field is used that causes the objects on which focusing is not performed to move in discrete jumps, the initial viewing conditions deteriorate when the discrete jumps become too large, to such an extent as to make observation possible only in the region of space in front of the screen where solid color is perfect. Objects shown at a distance from the screen appear to be made up of broken fragments that have been stuck together, having either too much or too little material. This happens in particular if the picture is made under conditions that exaggerate depth ("hyperstereoscopy"). Drawbacks then accumulate and, disturbance to the perception of relief is associated with discomfort due to the observation space being greatly limited. It is not desirable to make use of too great a depth of field for the scene to be displayed if, as is the case for television, available display resolution is limited. It is very tiring to observe objects that are far from the screen because our capacity to dissociate binocular vergence and monocular accommodation is limited. The object will be seen out of focus and in diplopia (failure of binocular fusion).

With reference to FIG. 2, the following applies:

$$p = f \frac{(d-D) \cdot \cos(\pi/2 - \alpha)}{d \cdot \sin(\pi/2 - \alpha) + [D \cdot \sin^2(\alpha)]/\cos(\alpha)}$$

$$\text{and } f = \frac{e}{2 \cdot \tan(\theta/2)}$$

$$\text{i.e. } p = f \frac{(d-D) \cdot \tan\alpha}{d + D \cdot \tan^2\alpha}$$

where:
p=the projection distance relative to the center $P_0$ of the projection screen;
f=the distance between the pinhole from the plane of the projection screen E, referred to as the focal length of a simulated camera;

D=the distance at which the aiming axes of the cameras converge on the sharp point P (D=OP);

d=the distance from the observed point to point O;

α=half the angle between two cameras (expressed in radians);

e=the width of the projection screen; and

θ=the full aperture angle of the field of observation of a simulated camera, i.e. its field angle.

The data for computing and evaluating the qualities of systems implemented are as follows:

the focal length f and the image width e which determine the field angle;

the horizontal resolution and the image width e which determine pixel size;

the focal length f and the aperture which determine the useful diameter of the pupil and the total stereoscopic base;

the total stereoscopic base and the selected number n of viewpoints which determine the useful base b between two adjacent simulated cameras, and thus between two adjacent viewpoints;

the stereoscopic base $b=O_1O_2=O_2O_3=O_3O_4$ between pairs of adjacent viewpoints, and the focusing distance OP (or the distance of the observed point corresponding simultaneously on the "monocular" viewpoints") which determine the angle 2α formed by the two optical axes of two adjacent cameras corresponding to two adjacent viewpoints; and the horizontal resolution, the focusing distance OP, and the stereoscopic base between two contiguous viewpoints which determine the stereoscopic depth of field while viewing.

The perception of relief is determined by the ratio that exists between the distance b and the variation in depth ΔD=d−D. This ratio, which varies as a function of b and of α, must be proportional to the linear magnification of the image to ensure that relief is perceived in realistic manner by an observer.

EXAMPLE I

Real camera: focal length of real objective lens system to be simulated=200 mm; aperture f/2; image width=57.6 mm, pixel size=0.1 mm; number n of viewpoints=4.

Focusing can begin at twice the focal length, i.e. 400 mm. This leads to images having the same size in the physical image plane as the filmed objects. The theoretical stereoscopic field of the apparatus with four viewpoints extends between 384 mm and 416 mm. An object whose image has a horizontal dimension equal to one apparent pixel (in fact a lens that is 0.4 mm wide) forms its image at the focal plane on one lens only, and all four pixels are used. If an object is placed at the limits of the theoretical stereoscopic depth of field:

at the lower limit (384 mm), the object appears to stand out from the display screen, the image occupies four lenses with a single pixel per lens as follows:
pixel positions in the columns of four:

(1, 2, 3, 4); (1, 2, 3, 4); (1, 2, 3, 4); (1, 2, 3, 4)

X  X  X  X at the upper limit (416 mm), the object appears to be behind the screen and the image occupies four lenses with a single pixel per lens as follows:

(1, 2, 3, 4); (1, 2, 3, 4); (1, 2, 3, 4); (1, 2, 3, 4)

X  X  X  X

Beyond these theoretical limits, objects form an image spread over more than four lenses and if a real camera is not stopped down, then pixels must share image area with other image points, thus giving an out-of-focus sensation which increases the more the above two limits are exceeded.

The above-mentioned real camera can be simulated by means of four pinhole cameras with b=3 cm, 2α=4.29°, and an angle θ corresponding to the field angle of the real camera. The focal length f of the simulated cameras can be selected in arbitrary manner. The number of simulated pixels corresponds to the desired resolution, i.e. 143 pixels horizontally for each simulated camera in order to obtain the resolution of the real camera.

For synthesized images, lack of focus exists only if it is specially computed. Beyond the above-mentioned limits, and when the observer moves relative to the display screen, the objects situated beyond the above-mentioned limits (e.g. 384 mm and 416 mm) move across a portion of screen in discrete jumps. So long as the angle 2α does not exceed 4.5°, viewing quality remains compatible with an observer moving relative to the display screen and with the visual comfort expected of standard video. With increasing angle α, at constant stereoscopic base, the focusing distance decreases. As this distance becomes shorter than the distance between the observer and the display screen, so the stereoscopic effect increases, with this hyperstereoscopy being compensated to some extent by the brain, while the stereoscopic depth of field decreases. There is a limit, corresponding to 2α=4.5°, beyond which quality is degraded to such an extent that the observer can no longer move relative to the screen.

The scene can then be observed only at the "solid color" distance. The small stereoscopic depth of field implies that the objects quickly project beyond the volume of the stereoscopic field, thereby constraining the observer to remain at the "solid color" distance. When the observer moves parallel to the display screen, the apparent movements of the objects are exaggerated, and can be disagreeable. For movements of the observer perpendicular to the display screen, those portions of an object which project beyond the volume of the stereoscopic field appear as poorly attached surface portions that are too big or too small, making observation painful and breaking the sensation of relief for the scene as a whole, thus losing the advantages of autostereoscopy.

If higher resolution is used and if more than four viewpoints are simulated, e.g. eight viewpoints, then the object can stay in focus while travelling over eight lenses instead of four. If the lenses are the same size as in the first case, then the stereoscopic depth of field is doubled. The necessary horizontal resolution is double using apparent pixels of the same size as in the first case (see below in the description corresponding to FIG. 4d).

With changing focus, the angle 2α decreases taking on values that become smaller and smaller (asymptotically):

for focusing at 500 mm: 3.43°
600 mm: 2.86°
800 mm: 2.14°
1000 mm: 1.71°
2000 mm: 0.85°
4000 mm: 0.42°
8000 mm: 0.21°, etc. . . .

When the distance doubles, the angle is halved. The ratio of the value of the stereoscopic depth of field to the value of the focusing distance is divided by a little more than two, which value increases with increasing distance. The stereoscopic depth of field becomes very quickly a significant percentage of the focusing distance. This makes it possible to determine the second limit value for the angle 2α which it is pointless to exceed, given the available resolution and the number of viewpoints. In the above example, focusing at 8000 mm gives a stereoscopic field that extends from 4444 mm to 40,000 mm for an angle 2α of 0.21°. At this distance, the horizon seems somewhat out of focus, but is acceptable, and the sensation of relief beyond the zone of stereoscopic depth of field is of no advantage using standard video resolution.

The useful limiting values on the angle 2α therefore lie in the range 4.5° to 0.20°.

Although it is not possible to interpret exactly the relationship that exists between the parameters of human vision in reality and those that apply to the real autostereoscopic picture-taking system, it is very easy to see that the method gives an impression of realism and of conformity in the images obtained.

This data can be used as being substantially equivalent to data on human binocular vision, or it can be considered that it introduces little or no distortion in the perception of relief via interposed video. From birth, our visual system has served as a basis for mental image processing which enables us to perceive relief: focal length, field angle, effective field angle as perceived through a window placed at a certain distance (equivalent to a television screen of the same apparent size), inter-pupil distance associated with physiological mechanisms for vergence, focusing, balancing the body, and estimating movement are all specific to each individual and have an influence on that individual's sensations.

The set of proprioceptive perceptions (internal perceptions of muscular forces and of ligament tensions required for balance, mobility, binocular fusion, etc. . . . ) constitutes a source of information that cannot be disconnected; this has consequences that are taken into account very little in conventional systems for taking pictures for showing images in relief.

The dimensions of an object in the two directions parallel to the plane of the screen (x and y) are divided by two when the object is twice as far away. It is possible to measure them by projection onto an image plane. The impression of relief (estimation of the third dimension (z)) can only be done by comparison between two flat images forming a stereoscopic pair. The difference between them (disparity, or quantity of apparent movement parallel to the image plane of objects in the scene relative to one another) makes it possible to create an impression that depends on the processing performed by the brain. It is very easy to introduce parameters that fool the observer by deforming estimated depth values. By selecting an angle 2α that is constant and by changing the picture-taking distances at the cost of a proportional modification to the stereoscopic base and to the focal length (which corresponds to a system at constant aperture: in our example f/2, and at constant field) it is possible to magnify or shrink all three dimensions uniformly, and for example a cube continues to be perceived as a cube but larger or smaller. An object is perceived of size that changes in inverse ratio to the size it would have had if our eyes were located at the pupil of the simulated objective lens system.

By modifying the stereoscopic base b without changing the other parameters, hyper-relief or hypo-relief is created (the object appears to be squashed or stretched in the depth direction) because the angle 2α is modified without modifying the focusing distance. The magnitudes (x and y) of an object are unchanged (estimation of object size and of depth being tied to vanishing traces in monocular vision), whereas depth as estimated by the stereoscopic effect is exaggerated or diminished, given that the disparity is changed.

To conclude, for human vision, when taking pictures or computing images, there exists ideally only one ratio between variation of disparity and variation of apparent dimensions associated with perspective for a given field angle. Changing the field angle (the "zoom" effect, or the "magnifying glass" effect on a portion of the image) is never equivalent to moving the camera towards the object (the "travelling" effect) because although the magnitudes (x and y) in a plane parallel to the image plane do indeed increase in the same manner in both effects, the ratio of the distance between the observer and the planes is changed only by "travelling", and so perception of depth is modified in that case only. We do not have "multifocal length" vision nor do we have "zoom" vision, and such effects seen in relief always give rise to disturbances to the sensation of depth. Only a "travelling" shot in relief can match reality exactly, providing the objective lens system used has a field angle that is equal to that formed by the screen at the observation distance, assuming the apparent magnification of an object filmed at the same distance as the distance between the spectator and the screen is equal to one.

If linear magnification is not equal to one, then it is necessary to introduce a correction coefficient to evaluate the field angle of the camera by considering the size of the screen that would indeed make linear magnification of one possible if located in the position of the real screen. A final point is that the focusing distance can be different from the screen observation distance. A collimating effect can be introduced artificially or in the absence of the small corrections described above. We are culturally very used to looking at television scenes filmed from a distance. The apparent field is greater therein. Consequently, with respect to relief, the effect of disparity is smaller than it would be in directly observed reality, however monocular clues enable the observer to transpose something seen with excessive vergence force and to compensate somewhat for the loss of sensation of depth because of the significant increase in the depth of field of the perceived scene.

The above considerations apply to setting the observed display screen at the ideal, "solid color" distance. If the observation distance is changed, by getting closer to the display screen, then to remain under exactly the same conditions, it is necessary to decrease the distance D of the camera to the object, and the field angle (e.g. horizontal field angle) must be increased in order to make the changed field angle formed by the display screen correspond with the new viewing distance. The stereoscopic base does not change.

If a screen of given dimensions at a given distance is replaced with a screen that is x times larger, and that is seen from a distance that is x times greater, then the perceived relief is exaggerated, but so long as x remains less than 3 or 4, the sensation of relief is considered as remaining acceptable so long as 2α lies in the above-specified limits (0.20°–4.5°).

EXAMPLE II

Real camera: focal length=50 mm, aperture f/2, image width=576×12.5 p; width of one pixel=12.5μ; four viewpoints. The focal length and the stereoscopic base are one-fourth of the values in Example I. The apparent magnification is therefore four. The field angle is halved.

Filming must be at one-fourth the distance to have the same angle 2α. In simulation, the stereoscopic base b is one-fourth its previous value. The disparity is the same, but the perceived size of background objects is a little large because of the change of field angle (which corresponds to a "zoom" effect). This does not matter since we are capable of correcting mentally so long as the effect is not too great (up to about three times). This evaluation takes account of the fact that we can move closer to the screen without difficulty to see the pairs (1 and 4) or to move away from it to see the pairs (1 and 2) or (2 and 3) or (3 and 4), with this giving rise to an apparent change of the angle subtended by the screen by a factor of three, on average. The fact of looking at a smaller scene is unusual in relief, and the exact evaluation of depth makes a little more use of our mental compensation.

Figure 3A:
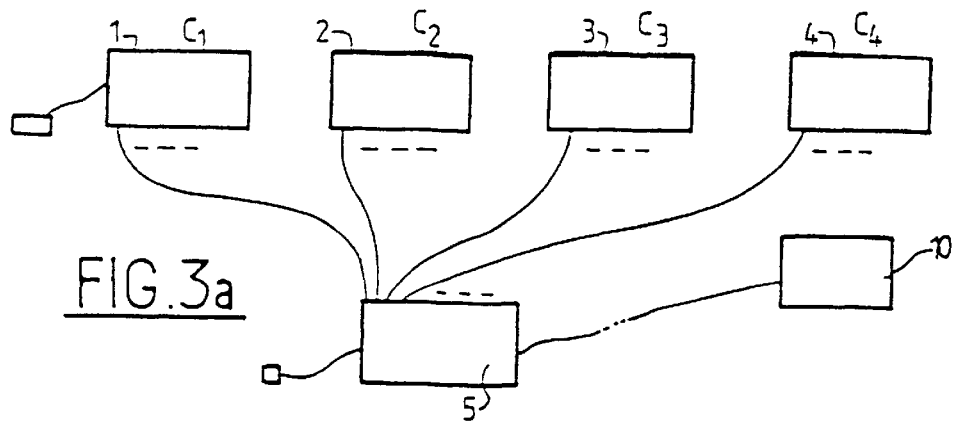
FIGS. 3a and 3b show two cases of an autostereoscopic image being built back up from elementary images supplied by the simulated cameras of the preceding figures.
Figure 3B:
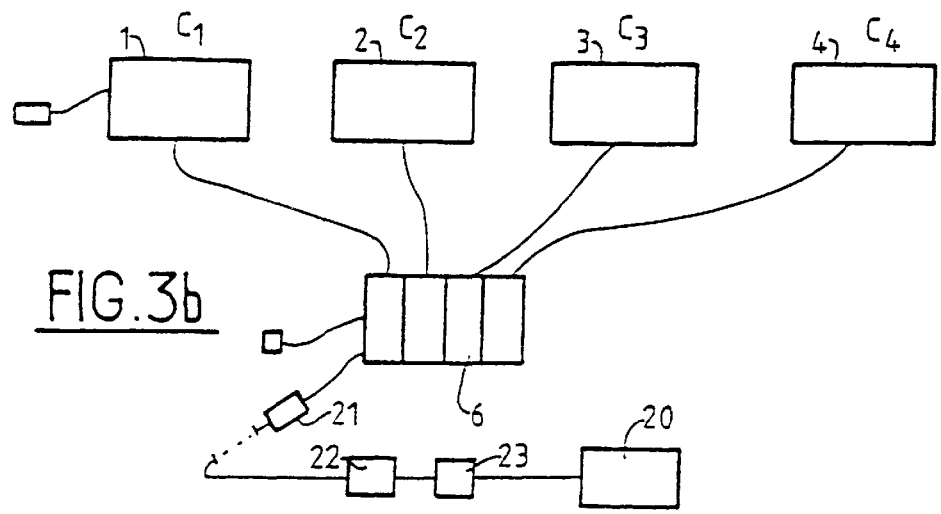

FIGS. 3a and 3b show signal processing for going from each of the elementary images 1, 2, 3, and 4 (n=4) given by the cameras $C_1$, $C_2$, $C_3$, and $C_4$ to an autostereoscopic image that may be displayed on a screen 10. Each of the images 1, 2, 3, and 4 is made up of X rows and Y columns, with each pixel having anisotropic resolution equal to the nominal resolution in the vertical direction and to 1/nth (i.e. ¼) of the nominal video resolution in the horizontal direction.

In FIG. 3a, the image 5 having X rows and nY columns is made up successively of the first column of image 1, the first column of image 2, the first column of image 3, the first column of image 4, the second column of image 1, and so on. The image 5 can be displayed directly on a stereoscopic video screen 30 fitted with a lens array.

In FIG. 3b, the images 1, 2, 3, and 4 are placed side by side to form an image 6 having X rows and nY columns comprising four flat images of anamorphosed format. The first Y columns of the image 6 are occupied by the pixels of the Y columns of image 1, the following Y columns by the Y columns of the image 2, and so on. This thus corresponds to the "n image" embodiment of patent FR-2 705 006 which is particularly suitable for recording and/or transmission. For example, in FIG. 3b, a transmitter 21 transmits the images 6 which are received by a receiver 22 and the columns thereof are permutated by a decoder 23 to obtain an image such as the image 5 displayable on the stereoscopic video screen 20 fitted with a lens array.

FIGS. 4a to 4d show four particularly advantageously variants of the invention.

Figure 4A:
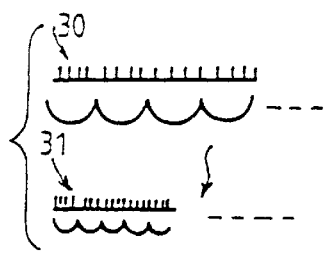
FIGS. 4a to 4d show four advantageous variants of the invention.

In FIG. 4a, starting from a four viewpoint system fitted on the screen 10 or 20 having a lens array 30 of given pitch, it is possible to improve the fineness of the image by increasing the number of pixels in the horizontal direction on the simulated camera and on the screen 10 or 20. A finer lens array 31 is then used on the screen 10 or 20. This corresponds to a real camera having a lens array of smaller pitch, and for which it is necessary to stop the sub-pupils down slightly in order to conserve the depth of field in the picture. In simulation, nothing changes and the stereoscopic depth of field is divided by two, but since the pitch of the lens array is twice as fine, the overall sensation (perception of apparent continuity) is the same.

Figure 4B:
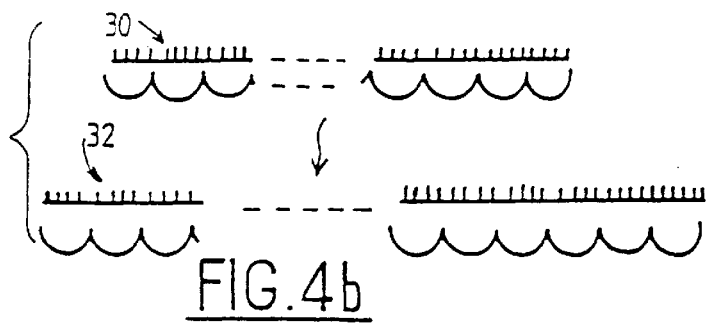

In FIG. 4b, the area of the image can be increased by adding pixels and cylindrical lenses. The screen 10 or 20 is increased in proportion and the lens array 30 is replaced by a larger array, but having the same pitch and the same focal length. This corresponds, for example, to changing over to 16/9 format, or cinemascope format. The parameters of the picture-taking system do not change and the stereoscopic depth of field remains the same.

Figure 4C:
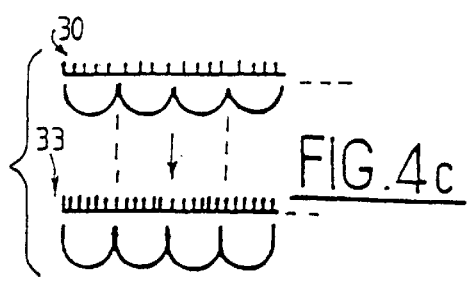

In FIG. 4c, it is possible to increase the solid angle of perception by increasing the number n of viewpoints without changing the angle 2α between two contiguous simulated cameras. No change is made to the number or the size of the cylindrical lenses, however the size of the image points (pixels) is decreased as is the focal length of the cylindrical lenses in the lens array 33 compared with that of the array 30. With a real camera, this corresponds to a larger pupil at equal focal length and to a decrease in the focal length of the lens array in correspondence with the increase in aperture angle, and also a decrease in pixel size. As before, the stereoscopic depth of field remains unchanged.

Figure 4D:
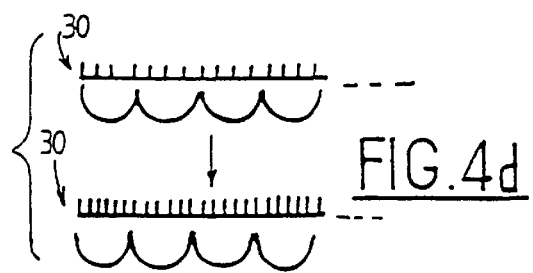

In FIG. 4d, angular resolution is increased in the observation solid angle by decreasing the angle 2α between two adjacent viewpoints in proportion to the number of additional viewpoints that are added. The array 30 is conserved and only the number of pixels is changed when taking pictures and when reproducing them. The result is an increase in the stereoscopic depth of field in proportion to the number of additional viewpoints since, to reach the limits of the stereoscopic depth of field, the image of an object moving from the sharp point along the bisector of the optical axes of the two extreme simulated cameras $C_1$ and $C_4$ must travel through n lenses (i.e. $n^2$ pixels), and the size of the lenses does not change, together with an increase of resolution in the depth direction. This case is particularly advantageous when the number n of viewpoints exceeds 4. The angle 2α then lies in the range 18°/n to 0.8°/n. For example, for 6 viewpoints, 2α varies over the range 3° to 0.13°.

There are two different ways of creating converging optical axes for the n cameras (with n≧3).

The first way consists in positioning them as shown in FIGS. 1 and 2a.

In the nominal position, the simulated image planes or screens $E_1$ to $E_4$ are tangential to a circle of radius equal to the simulated focusing distance ($O_1O=O_2P=O_3P=O_4P=D'$). The optical axis ($A_1$, . . . , $A_4$) of each simulated camera, defined as the axis perpendicular to the plane of its screen ($E_1$, . . . , $E_4$) and passing through the point $P_0$, also passes through the corresponding pin-hole ($O_1$, . . . , $O_4$). This system suffers from a relative drawback when the simulated focal length is short (large field) and the focusing distance is close up. The rotation of the image planes causes objects that are far from the horizon and from the vertical axis passing through the center images to have different sizes, thereby limiting the capacity for binocular fusion because corresponding pixels from two viewpoints have different heights. Rotation of the cameras gives rise to a rectangle (window equivalent to screen $E_1$ to $E_4$) of images deformed into trapezoids in the vertical direction.

The four focus planes passing through the point P are not coplanar, given that the focus planes are situated in the image planes.

Figure 6:
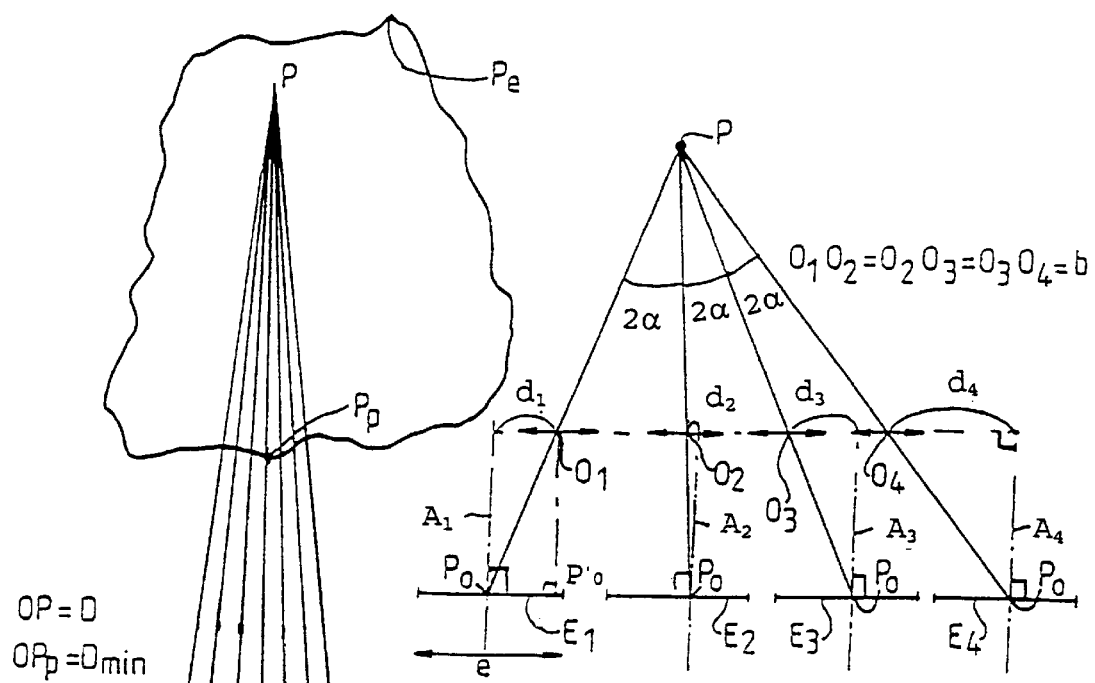
FIG. 6 shows a preferred embodiment of the invention.

The second solution is the preferred solution and it is shown in FIG. 6. It consists in placing the n cameras with their optical centers $O_1$, $O_2$, $O_3$, and $O_4$ in lignment on an axis x'x and with their simulated ensitive surfaces or screens $E_1$ to $E_4$ mutually parallel, i.e. with their optical axes $A_1$ to $A_4$ parallel to one another and to the axis x'x, and in sliding the four simulated optical systems laterally so as to be off-center in the directions of the arrows so as to align the respective centers $P_0$ of the simulated images with the respective optical centers ($O_1$, . . . , $O_4$) of the corresponding optical systems and with the sharp point P. For a given rectangular image, its center $P_0$ is the point of intersection of the diagonals of the image framed for display purposes. To a first approximation, it is assumed that the point P is at the same distance D' from the optical centers of the simulated cameras, i.e. $O_1P \approx O_2P \approx O_3P \approx O_4P$. In other words, the points of intersection $P_0$ between the straight lines $O_1P$, $O_2P$, $O_3P$, and $O_4P$ with the simulated image planes $E_1$, $E_2$, $E_3$, and $E_4$, determine the nominal centers of the images to be displayed on the projection screen or back-projection screen. Under such circumstances, a rectangle equivalent to the screen window ($E_1, \ldots, E_4$) of width e and corresponding to the sharp point P is perceived as a rectangle for each simulated camera. Variation in the inter-camera distance b is performed by modifying the degree of off-centering ($d_1, \ldots, d_4$) of the simulated cameras. In FIG. 6, the angles and the off-centering are exaggerated in order to facilitate understanding.

The simulated cameras are preferably pinhole cameras.

The other image planes remain mutually parallel, and at infinity there is no distortion between the four images of a given object. The axes passing via the point P and the optical centers ($O_1$, $O_2$, $O_3$, $O_4$) of the simulated cameras are then, in general, no longer the optical axes of the simulated cameras. Both solutions lead to the same limiting values for the angles $2\alpha$. The inter-camera distance b remains equal to the distance between the optical centers, e.g. $O_1$ and $O_2$ of two adjacent simulated cameras.

Figure 2B:
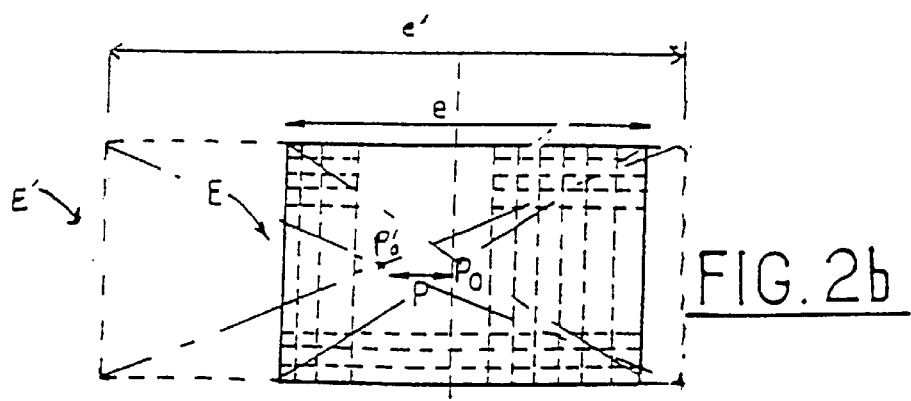

In practice, it is possible to avoid modifying the software used by defining screen windows E', i.e. ($E'_1, \ldots, E'_4$) each having a center $P'_0$ and a width e' that is greater than the width e of the simulated image and that has the same height (see FIG. 2b). The point of intersection between the straight line ($PO_1, \ldots, PO_4$) and the corresponding screen window ($E'_1, \ldots, E'_4$) is the point $P_0$. A subwindow ($E_1, \ldots, E_4$) of width e having the desired image format and whose center is $P_0$ is extracted from the above-defined screen window ($E'_1, \ldots, E'_4$). The program is used to compute the pixels of the subwindow ($E_1, \ldots, E_4$). There is no point in computing all of the pixels in each of the windows ($E'_1, \ldots, E'_4$).

What is claimed is:

1. A method of acquiring simulated autostereoscopic video images of a scene to be viewed, comprising: starting from stored data including three-dimensional information about an object or the scene to be viewed on a display screen, implementing n simulated cameras, wherein $n \geq 3$, each generating an image of said scene, and each having an optical center and a simulated sensitive surface having a center, the simulated cameras being equidistant and spaced-apart by the same inter-camera distance b which remains constant while a picture is being taken with a constant field angle, and wherein each of the simulated cameras has an axis passing through the center of its simulated sensitive surface, through its optical center, and also through a point P referred to as the simulated sharp point, situated substantially at the same distance D' from all of said simulated cameras, and further comprising generating said scene to be viewed as having a nearest point $P_p$ and a farthest point $P_e$, and wherein the inter-camera distance b and the distance $D_{min}$ between the simulated set of cameras and the nearest point $P_p$ are selected in such a manner that for taking said picture and for a sharp point that varies between the nearest point $P_p$ and the farthest point $P_e$, the angle $2\alpha$ between said axes of two adjacent simulated cameras varies between a value that is not greater than 4.5° for the nearest point $P_p$ of the generated scene and not less than 0.2° for the farthest point $P_e$ of the generated scene, said generated scene comprising only points situated between said nearest point $P_p$ and said farthest point $P_e$.

2. A method according to claim 1, wherein for a scene including a point $P_e$ situated at infinity, the inter-camera distance b is selected so that for the angle $2\alpha$ having a value of 0.2°, the simulated sharp point P is situated at a distance $D_{max}$ such that the image of an object moving from the distance $D_{max}$ to infinity along the bisector of said axes of two extreme simulated cameras moves on the display screen through a distance no greater than $n^2$ times the pixel pitch.

3. A method of acquiring simulated stereoscopic images of an object or a scene to be viewed, comprising: starting from stored data including three-dimensional information about the object or the scene to be viewed on a display screen, implementing n simulated cameras, wherein $n \geq 4$, each generating an image of said scene, and each having an optical center and a simulated sensitive surface having a center, the simulated cameras being equidistant and spaced-apart by the same inter-camera distance b which remains constant while a picture is being taken, and wherein each of the simulated cameras has an axis passing through the center of its simulated sensitive surface, through its optical center, and also through a point P referred to as the simulated sharp point, situated substantially at the same distance D' from all of said simulated cameras, and further comprising generating said scene to be viewed as having a nearest point $P_p$ and a farthest point $P_e$, and wherein the inter camera distance b and the distance $D_{min}$ between the simulated set of cameras and the nearest point $P_p$ are selected in such a manner that for taking said picture and for a sharp point that varies between the nearest point $P_p$ and the farthest point $P_e$, the angle $2\alpha$ between said axes of two adjacent simulated cameras varies between a value that is not greater than 18°/n for the nearest point $P_p$ and not less than 0.8°/n for the farthest point $P_e$ of the generated scene, said generated scene comprising only points situated between said nearest point $P_p$ and said farthest point $P_e$.

4. A method according to claim 3, wherein, for a scene including a point $P_e$ situated at infinity, the inter-camera distance b is selected so that for the angle $2\alpha$ having a value of 0.8°/n, the simulated sharp point P is situated at a distance $D_{max}$ such that the image of an object moving from the distance $D_{max}$ to infinity along the bisector of said axes of two extreme simulated cameras moves on the display screen through a distance no greater than $n^2$ times the pixel pitch.

5. A method according to claim 1, wherein said axes are the optical axes of the simulated cameras.

6. A method according to claim 1, wherein the simulated cameras have their simulated sensitive surfaces parallel to one another and disposed substantially in a common plane, and wherein the stereoscopic base b is obtained by off-centering.

7. A method according to claim 1, wherein the simulated cameras are of the pinhole type.

8. A method according to claim 1, wherein each image point of the simulated camera is associated with vertical resolution equal to the nominal vertical resolution of the video image and horizontal resolution equal to 1/nth the nominal horizontal resolution of the video image.

9. A method according to claim 1, including a step of interleaving P columns of n elementary images to obtain an interleaved autostereoscopic video image having n×p columns.

10. A method according to claim 1, including a step of changing the apparent size of an object or of a scene without disturbing its shape starting from focusing at said distance D' by displacing the simulated cameras without changing the sharp point, the angle $2\alpha$ being kept constant, and the value of the inter-camera distance b being changed in proportion to the change in the focusing distance.

11. A method according to claim 1, wherein the image includes stereoscopic pairs having a given stereoscopic base B, the viewpoints of said stereoscopic pair being separated by m intermediate viewpoints, where m is an integer $\geq 1$.

12. A method according to claim 11, including a step of viewing under conditions where, at the ideal, "solid color" distance, an observer sees one of said stereoscopic pairs having viewpoints that are separated by m elementary viewpoints.

13. An autostereoscopic video system comprising:

apparatus for acquiring simulated autostereoscopic video images of a scene to be viewed, the apparatus comprising a database containing stored data including three-dimensional information about an object or the scene to be viewed on a display screen, apparatus for generating n simulated cameras, where $n \geq 3$, each generating an image of said scene and each having an optical center and a simulated sensitive surface having a center, the simulated cameras being equidistant and spaced-apart by a common inter-camera distance b which remains constant while taking pictures with a constant field angle, and each of the simulated cameras has an axis passing through the center of its simulated sensitive surface, through its optical center, and through a point P referred to as the "simulated sharp point" situated substantially at the same distance D' from all of said simulated cameras, the scene to be viewed having a nearest point $P_p$ and a farthest point $P_e$, said apparatus for generating n simulated cameras being set up so that the inter-camera distance b and the distance $D_{min}$ between the set of simulated cameras and the nearest point $P_p$ satisfies the condition whereby, for said picture and for focusing varying between the nearest point $P_p$ and the farthest point $P_e$, the angle $2\alpha$ between said axes of two adjacent simulated cameras varies between a value not greater than 4.5° for the point $P_p$ and a value not less than 0.2° for the point $P_e$; and display apparatus in which an observer at the ideal, "solid color" distance sees a stereoscopic pair comprising two viewpoints separated by m intermediate viewpoints where m is greater than or equal to 1.

14. A system according to claim 13, wherein the apparatus for generating n simulated camera is set up so that, for a scene having a point $P_e$ situated at infinity, the inter-camera distance b is such that for the angle $2\alpha$ having a value equal to 0.2°, the simulated sharp point P is situated at a distance $D_{max}$ such that the image of an object from the distance $D_{max}$ to infinity along the bisector of said axes of the two extreme simulated cameras moves on the display screen through a distance no greater than $n^2$ times the pixel pitch.

15. An autostereoscopic video system comprising:

apparatus for acquiring simulated stereoscopic video images of an object or of a scene to be viewed, the apparatus comprising a database containing stored data including three-dimensional information about the object or the scene to be viewed on a display screen, apparatus for generating n simulated cameras, where n>4, each generating an image of said scene and each having an optical center and a simulated sensitive surface having a center, the simulated cameras being equidistant and spaced-apart by a common inter-camera distance b which remains constant while taking pictures, and each of the simulated cameras has an axis passing through the center of its simulated sensitive surface, through its optical center, and through a point P referred to as the "simulated sharp point" situated substantially at the same distance D' from all of said simulated cameras, the scene to be viewed having a nearest point $P_p$ and a farthest point $P_e$, said apparatus for generating n simulated cameras being set up so that the inter-camera distance b and the distance $D_{min}$ between the set of simulated cameras and the nearest point $P_p$ satisfies the condition whereby, for said picture and for focusing varying between the nearest point $P_p$ and the farthest point $P_e$, the angle $2\alpha$ between said axes of two adjacent simulated cameras varies between a value not greater than 18°/n for the point $P_p$ and a value not less than 0.8°/n for the point $P_e$; and display apparatus in which an observer at the ideal, "solid color" distance sees a stereoscopic pair comprising two viewpoints separated by m intermediate viewpoints where m is greater than or equal to 1.

16. A system according to claim 15, wherein the apparatus for generating n simulated camera is set up so that, for a scene having a point $P_e$ situated at infinity, the inter-camera distance b is such that for the angle $2\alpha$ having a value equal to 0.8°/n, the simulated sharp point P is situated at a distance $D_{max}$ such that the image of an object from the distance $D_{max}$ to infinity along the bisector of said axes of the two extreme simulated cameras moves on the display screen through a distance no greater than $n^2$ times the pixel pitch.

17. A system according to claim 13, wherein said axes are the optical axes of the simulated cameras.

18. A system according to claim 13, wherein the simulated cameras have their simulated sensitive surfaces parallel to one another and disposed substantially in a common plane, and wherein the system includes apparatus for off-centering the simulated cameras.

* * * * *